US012578936B2

(12) United States Patent
Vijayaraghavan

(10) Patent No.: US 12,578,936 B2
(45) Date of Patent: Mar. 17, 2026

(54) TECHNIQUES FOR MODEL-BASED ELEMENT CREATION IN EFFECT CREATION TOOLS

(71) Applicant: Lemon Inc., Grand Cayman (KY)

(72) Inventor: Lakshminarayanan Vijayaraghavan, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 236 days.

(21) Appl. No.: 18/447,734

(22) Filed: Aug. 10, 2023

(65) Prior Publication Data

US 2025/0053390 A1 Feb. 13, 2025

(51) Int. Cl.
*G06F 9/44* (2018.01)
*G06F 8/35* (2018.01)
(52) U.S. Cl.
CPC ...................................... *G06F 8/35* (2013.01)
(58) Field of Classification Search
CPC ......................................................... G06F 8/35
See application file for complete search history.

(56) References Cited

U.S. PATENT DOCUMENTS

| | | | | | |
|---|---|---|---|---|---|
| 10,528,329 | B1 * | 1/2020 | Doyle | ........................ | G06F 8/31 |
| 11,886,826 | B1 * | 1/2024 | Bavarian | ............... | G06F 40/253 |

| | | | | | |
|---|---|---|---|---|---|
| 2009/0244071 | A1 * | 10/2009 | Kuo | ........................ | G06F 40/55 |
| | | | | | 704/E21.001 |
| 2016/0062954 | A1 * | 3/2016 | Ruff | ....................... | G06F 40/205 |
| | | | | | 715/249 |
| 2020/0272432 | A1 * | 8/2020 | Shaikh | ..................... | G06N 3/08 |
| 2021/0357599 | A1 * | 11/2021 | Gupta | ................... | G06F 40/253 |
| 2023/0126177 | A1 | 4/2023 | Xu et al. | | |
| 2023/0148406 | A1 | 5/2023 | Ganz et al. | | |
| 2023/0230085 | A1 * | 7/2023 | Turgeman | .............. | G06Q 20/10 |

FOREIGN PATENT DOCUMENTS

KR 10-2020-0092491 A 8/2020

OTHER PUBLICATIONS

International Search Report for PCT/SG2024/050355, mailed on Jul. 16, 2024, 4 pages.

* cited by examiner

*Primary Examiner* — Qamrun Nahar
(74) *Attorney, Agent, or Firm* — Astute IP Law Group

(57) ABSTRACT

Described are examples for creating elements in an effect creation tool, including receiving, via a user interface provided for the effect creation tool, a natural language string requesting creation of an element in the effect creation tool, providing, to a model, an input including at least a portion of the natural language string, receiving, from the model and based on the input, an output string, in an expected syntax, corresponding to creating the element, mapping the output string to one or more commands of a format for creating the element in the effect creation tool, and providing the one or more commands to the effect creation tool to cause creation of the element in the effect creation tool.

17 Claims, 4 Drawing Sheets

200 ⟶

200 ⟍

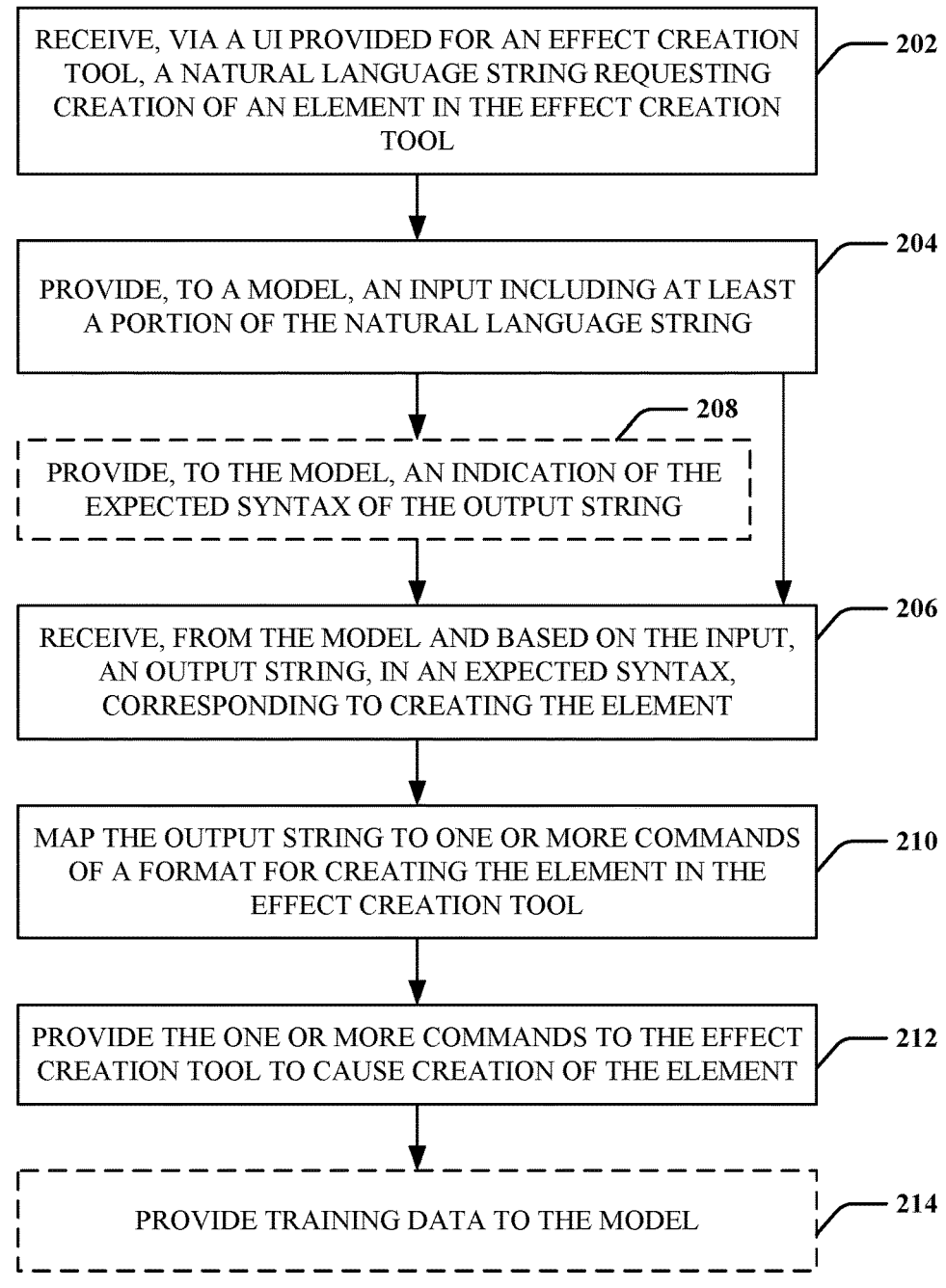

RECEIVE, VIA A UI PROVIDED FOR AN EFFECT CREATION TOOL, A NATURAL LANGUAGE STRING REQUESTING CREATION OF AN ELEMENT IN THE EFFECT CREATION TOOL — 202

PROVIDE, TO A MODEL, AN INPUT INCLUDING AT LEAST A PORTION OF THE NATURAL LANGUAGE STRING — 204

PROVIDE, TO THE MODEL, AN INDICATION OF THE EXPECTED SYNTAX OF THE OUTPUT STRING — 208

RECEIVE, FROM THE MODEL AND BASED ON THE INPUT, AN OUTPUT STRING, IN AN EXPECTED SYNTAX, CORRESPONDING TO CREATING THE ELEMENT — 206

MAP THE OUTPUT STRING TO ONE OR MORE COMMANDS OF A FORMAT FOR CREATING THE ELEMENT IN THE EFFECT CREATION TOOL — 210

PROVIDE THE ONE OR MORE COMMANDS TO THE EFFECT CREATION TOOL TO CAUSE CREATION OF THE ELEMENT — 212

PROVIDE TRAINING DATA TO THE MODEL — 214

DEVICE 400

PROCESSOR(S) 402

MEMORY/MEMORIES 404

COMMUNICATIONS MODULE 406

DATA STORE 408

USER INTERFACE MODULE 410

EFFECT CREATION TOOL 110

TECHNIQUES FOR MODEL-BASED ELEMENT CREATION IN EFFECT CREATION TOOLS

BACKGROUND

The described aspects relate to effect creation tools, and more particularly, creating elements in the effect creation tools.

Game engines exist for simplifying creating of video games or other video-based applications or features by providing much of the video processing or presentation framework, along with tools to facilitate creation of the video games or other video-based applications or features using the framework. The tools can include effect creation tools, such as game engine-based tools, and can include a user interface or other mechanism allowing users to specify elements to be created in the effect creation tool, such as layouts, images, etc. to be included in creating the video applications, video effect, and/or corresponding features. The game engine-based tools can generate, based on inter-actions with the user interface, corresponding instructions that are of a syntax that the game engine can process. The game engine can accordingly generate corresponding video-based applications, video effects, or features based on the syntax generated by the tools.

Social media applications can also use game engines for certain functions. For example, a video capture and editing application can use game engines to display captured video, display images or animations or other video effects over a displayed video to allow interaction with the displayed video, etc. For example, a facemask can be created and displayed over a face that is the subject of the video, or an avatar can be created and displayed over the video. An effect creation tool that interfaces with the game engine can be used to create the video effects (e.g., the facemask, avatar, etc.), or certain elements used in creating the video effects, for use with the video capture and editing application. Using the effect creation tool can require a user thereof to have specific knowledge of how to create different elements or other features in the effect creation tool, such as resources, components, effects, gameplay elements, etc., as well as artistic ability to adapt created or modified textures to be compatible with a video or other scene on which the assets are used, etc.

SUMMARY

The following presents a simplified summary of one or more implementations in order to provide a basic under-standing of such implementations. This summary is not an extensive overview of all contemplated implementations, and is intended to neither identify key or critical elements of all implementations nor delineate the scope of any or all implementations. Its sole purpose is to present some con-cepts of one or more implementations in a simplified form as a prelude to the more detailed description that is presented later.

In an example, a computer-implemented method for cre-ating elements in an effect creation tool is provided that includes receiving, via a user interface provided for the effect creation tool, a natural language string requesting creation of an element in the effect creation tool, providing, to a model, an input including at least a portion of the natural language string, receiving, from the model and based on the input, an output string, in an expected syntax, corresponding to creating the element, mapping the output string to one or more commands of a format for creating the element in the effect creation tool, and providing the one or more com-mands to the effect creation tool to cause creation of the element in the effect creation tool.

In another example, an apparatus for creating elements in an effect creation tool is provided that includes one or more processors and one or more non-transitory memories with instructions thereon. The instructions upon execution by the one or more processors, cause the one or more processors to receive, via a user interface provided for the effect creation tool, a natural language string requesting creation of an element in the effect creation tool, provide, to a model, an input including at least a portion of the natural language string, receive, from the model and based on the input, an output string, in an expected syntax, corresponding to cre-ating the element, map the output string to one or more commands of a format for creating the element in the effect creation tool, and provide the one or more commands to the effect creation tool to cause creation of the element in the effect creation tool.

In another example, one or more non-transitory computer-readable storage media storing instructions that when executed by one or more processors cause the one or more processors to execute a method for creating elements in an effect creation tool are provided. The method includes receiving, via a user interface provided for the effect creation tool, a natural language string requesting creation of an element in the effect creation tool, providing, to a model, an input including at least a portion of the natural language string, receiving, from the model and based on the input, an output string, in an expected syntax, corresponding to cre-ating the element, mapping the output string to one or more commands of a format for creating the element in the effect creation tool, and providing the one or more commands to the effect creation tool to cause creation of the element in the effect creation tool.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, how-ever, of but a few of the various ways in which the principles of various implementations may be employed, and this description is intended to include all such implementations and their equivalents.

BRIEF DESCRIPTION OF THE DRAWINGS

FIG. 2 is a flow diagram of an example of a method for using a model for creating elements in an effect creation tool, in accordance with examples described herein.

DETAILED DESCRIPTION

Figure 1:
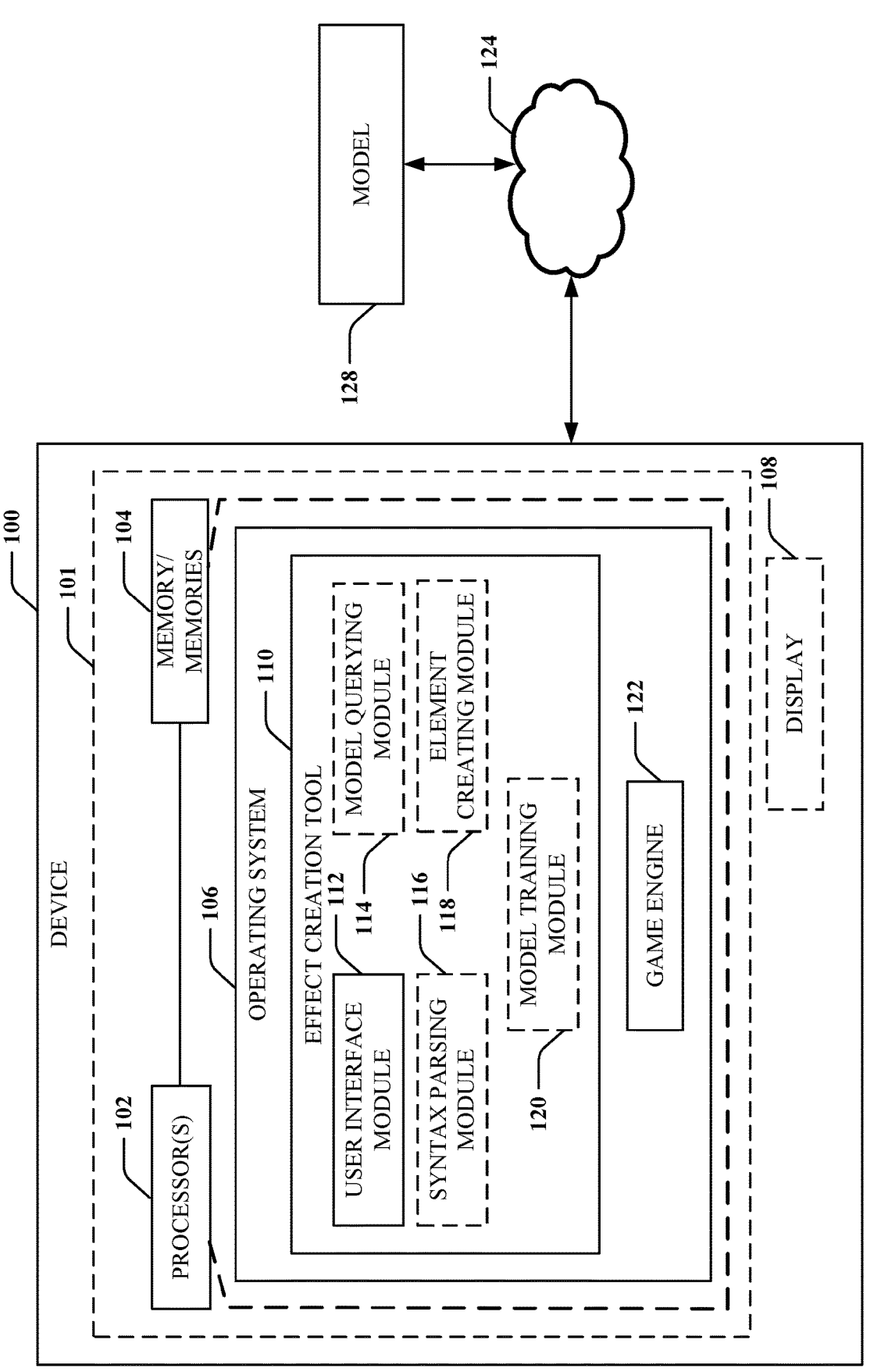
FIG. 1 is a schematic diagram of an example of a system for using a model in creating elements in an effect creation tool, in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to using a model, such as an artificial intelligence (AI) or machine learning (ML) model, to assist in creating elements in an effect creation tool. An effect creation tool can include an application that allows for creating video applications (e.g., games, social media applications, etc.), visual effects or video effects for video applications or other applications, video features for video applications or other applications, augmented reality (AR) or virtual reality (VR) effects for video applications or other applications, etc. For example, an effect creation tool can be provided to operate with a game engine to allow for creating the video applications, visual effects, AR/VR effects, etc. for rendering using the game engine. As described, the game engine can provide a framework for video processing or presentation, and applications or tools (including an effect creation tool) can use the framework to create video applications, video effects, etc. using the game engine. In one example, effect creation tools can include game engine-based tools that are developed in conjunction with the game engine to provide a mechanism for creating videos or video effects using user interface commands. A game engine can provide a platform or framework for rendering video via a display device, where the game engine can include low-level instructions for rendering video via one or more processors (e.g., a central processing unit (CPU) and/or a graphics processing unit (GPU)), and can expose instructions or interfaces that other applications (e.g., game engine-based tools) can utilize to cause the game engine to render certain graphics or video.

In accordance with aspects described herein, models can be used to create video effects in an effect creation tool based on natural language requests that are input, e.g., via a user interface (UI), in the effect creation tool. For example, the effect creation tool can include a UI that includes options for inputting natural language queries to cause creation of certain elements in the effect creation tool, such as resources (e.g., textures, materials, etc.), visual effects, gameplay elements (e.g., entities, components, scripts), etc. The elements can For example, the UI can include options at certain steps in creating a video application (e.g., game or social media application or effect) that allow for generating the elements. The natural language requests can be provided to a model to obtain resulting syntax for creating the elements in the video application. A parser can parse and map the resulting syntax to commands (e.g., application programming interface (API) calls) for providing to the effect creation tool to create the elements.

In this regard, a user using the effect creation tool can create elements in the effect creation tool using natural language request and without requiring the user to have knowledge or artistic ability to create the elements. This can result in improved user experience when using the effect creation tool, and can allow users that may not be sophisticated in video effect creation or processing to create elements for use in video creation using the natural language requests rather than having to know and use other processes in the effect creation tool to create the elements.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X. Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X. Y, and Z (e.g., instructions to perform X) and at least a second memory configured or operable to store or having stored thereon a second subset of instructions for performing a second subset of X. Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X. and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X. Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Turning now to FIGS. 1-4, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a system for using models in creating elements in an effect creation tool, in accordance with aspects described herein. The system includes a device 100 (e.g., a computing device) that includes processors(s) 102 (e.g., one or more processors) and/or memory/memories 104 (e.g., one or more memories). In an example, device 100 can include processor(s) 102 and/or memory/memories 104 configured to execute or store instructions or other parameters related to providing an operating system 106, which can execute one or more applications, services, etc. The one or more applications, services, etc. may include an effect creation tool 110, which can be or include an application that facilitates creation of videos, applications that include videos (e.g., games), video effects, or other video features, where a game engine 122 (e.g., also executing via operating system 106) can render the videos to a display 108. For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component 101), and/or the like. In other examples, processor(s) 102 can include multiple processors 102 of multiple devices 100, memory/memories 104 can include multiple memories 104 of multiple devices 100, etc. Memory/memories 104 may store instructions, parameters, data structures, etc., for use/execution by processor(s) 102 to perform functions described herein.

In addition, the device 100 can include substantially any device that can have a processor(s) 102 and memory/memories 104, such as a computer (e.g., workstation, server, personal computer, etc.), a personal device (e.g., cellular phone, such as a smart phone, tablet, etc.), a smart device, such as a smart television, and/or the like. Moreover, in an example, various components or modules of the device 100 may be within a single device, as shown, or distributed to different devices that are communicatively coupled with one another (e.g., in a network).

Effect creation tool 110 can include a user interface module 112 for generating user interfaces for outputting to a display 108 of the device 100 (or a display of another device). For example, user interface module 112 can accept input interactions on a displayed user interface from a user for creating videos, applications that include videos (e.g., games), or other video features (e.g., effects for videos), etc., as described herein. For example, the interactions may include creation of certain elements in the videos, application, etc., such as resources, components, effects, gameplay elements, etc. for use in adding to or modifying videos. In addition, user interface module 112 can output to the display 108 of the device 100, such as output the video being created, output a menu with interactable options for creating the video, such as the elements that can be added to or used to modify an image or video. In addition, in an example, effect creation tool 110 can optionally include a model querying module 114 for querying a model for obtaining expected syntax from natural language requests, a syntax parsing module 116 for parsing or mapping the syntax to commands for creating elements in the effect creation tool 110, an element creating module 118 for creating the elements in the effect creation tool 110 based on the command mapped from the syntax, and/or a model training module 120 for training the model based on natural language requests an desired image results for the requests. In addition, the device 100 can communicate with a model 128 (e.g., an AI or ML model), which can be via a network 124 for a remotely located model 128 or the model 128 can be stored in memory/memories 104, in some examples.

In an example, effect creation tool 110 can provide, via user interface (UI) module 112, one or more UIs (e.g., graphical UIs) that facilitate creating video applications, video features, etc. for executing using game engine 122. Game engine 122 can provide a platform for rendering video on display 108, or other display device, using the one or more processors 102 (e.g., a central processing unit (CPU) and/or a graphics processing unit (GPU)). For example, effect creation tool 110 can include a video creation studio application having features such as options for creating a canvas for the video, inserting textures, overlays, etc. into the video, a video preview window to preview a created video, and/or the like. In various examples, effect creation tool 110 can support operations that include adding elements for use in creating or modifying an image or a video, and can support the operations in one or more UIs provided via user interface module 112. Aspects described herein relate to using models for creating elements in the effect creation tool 110 using natural language requests, which can reduce complexity of using the effect creation tool 110.

In an example, for one or more operations provided by the user interface module 112, once the option is selected or engaged by interaction from a user via a user interface, model querying module 114 can query a model 128 with certain input to retrieve one or more image results. For example, user interface module 112 can receive, from user interaction, a natural language request for creating an element for use in the effect creation tool 110. Model querying module 114 can provide at least a portion of the natural language request as input to the model 128. In an example, model querying module 114 may also provide, to the model 128, information regarding an expected syntax for output generated based on the input. The expected syntax may include output format information, a collection of output values that can be returned, etc. In an example, model querying module 114 can receive an output string from the model 128 in the expected syntax. Syntax parsing module 116 can parse the output string to generate commands for providing to the element creating module 118 for creating the element in the effect creation tool 110. For example, element creating module 118 can accordingly cause creation of the element in the effect creation tool 110 (e.g., as a new resource, component, effect, gameplay element, etc.), which may include storing associated parameters of the element in memory/memories 104, loading the element from the memory/memories 104 for display on a UI provided by user interface module 112, etc. In an example, user interface module 112 can provide the element as a selectable option for incorporating into a video application or feature being created using the effect creation tool 110.

In an example, model training module 120 can provide training data to the model 128 to tailor results received from subsequent queries to the model 128. For example, the training data can include a set of natural language requests and associated output strings, information that includes the expected syntax (e.g., codebase for the effect creation tool 110, documentation or tutorials of the effect creation tool 110, etc.). In another example, the training data may be based on feedback received from users (e.g., via a UI provided by user interface module 112) indicating whether results provided by the model 128 in response to a natural language request accurately represent the intent of the user's request.

FIG. 2 is a flowchart of an example of a method 200 for using a model for creating elements in an effect creation tool, in accordance with aspects described herein. For example, method 200 can be performed by a device 100 executing an effect creation tool 110 and/or one or more components thereof for creating elements based on natural language requests by using models.

In method 200, at action 202, a natural language string requesting creation of an element in an effect creation tool can be received via a UI provided by the effect creation tool. In an example, user interface module 112, e.g., in conjunction with processor(s) 102, memory/memories 104, operating system 106, effect creation tool 110, etc., can receive, via the UI provided by the effect creation tool, the natural language string requesting creation of the element in the effect creation tool. For example, the user interface module 112 can display, via display 108, various UIs the allow for user interaction with the UIs to select options for creating video content, such as a video, game, video effect, etc., using the effect creation tool. For example, the UIs can include options or operations for creating certain elements for use in adding to or modifying the video content. As described, the elements can include resources, components, effects, gameplay elements, etc. As part of an option for creating elements, user interface module 112 can provide a mechanism, such as a text input box, for a user to enter a natural language request related to creating one or more elements. For example, on a UI for creating video content that includes effects, resources or other assets, components, etc., user interface module 112 can include a selection to display text box for requesting effect creation using natural language. For example, the text box can allow a user to type the natural language request for creating a certain element.

In method 200, at action 204, an input including at least a portion of the natural language string can be provided to a model. In an example, model querying module 114, e.g., in conjunction with processor(s) 102, memory/memories 104, operating system 106, effect creation tool 110, etc., can provide, to the model (e.g., model 128), the input including at least the portion of the natural language string. For example, model querying module 114 can provide the natural language string as received, can add contextual parameters or strings to the natural language string for use by the model 128, can remove terms from the natural language string, and/or the like. As described, the model 128 can be remotely located or stored on device 100 (e.g., in memory/ memories 104). In one example, model querying module 114 can query multiple models based on the input.

In method 200, at action 206, an output string in an expected syntax corresponding to creating the element can be received from the model based on the input. In an example, model querying module 114, e.g., in conjunction with processor(s) 102, memory/memories 104, operating system 106, effect creation tool 110, etc., can receive, from the model (e.g., model 128) and based on the input, the output string, in the expected syntax, corresponding to creating the element. For example, the model can be trained or otherwise configured to provide output in the expected syntax. For example, the expected syntax can include a set of category parameter names, which can correspond to an element type and/or parameters for the element type, along with, for each of the multiple parameter names, multiple possible parameter values.

For example, for creating light effects, the expected syntax may include a category parameter "Lights" with multiple possible values of "DirectionalLight", "PointLight", "SpotLight", etc., which can be supported by the effect creation tool 110. For creating objects, the expected syntax may include a category parameter "Objects" with multiple possible values of "CubeMesh", "SphereMesh", "PlaneMesh", etc., which can be supported by the effect creation tool 110. For creating effects, the expected syntax may include a category parameter "Effects" with multiple possible values of "FaceMask", "HairSegmentation", etc., which can be supported by the effect creation tool 110. For creating materials, the expected syntax may include a category parameter "Materials" with multiple possible values of "Unlit", "PBR", etc., which can be supported by the effect creation tool 110. In an example, an expected syntax for textures can include additional information for applying the texture, such as where to locate the texture, how to apply the texture, etc., such as "LibraryMap [Texture, 3D model, . . . ]". In this regard, for example, the model 128 can be trained or configured to provide an output string in the format of [Category]:[Value], e.g., "[Objects]:[SphereMesh]".

In method 200, optionally at action 208, an indication of an expected syntax of an output string can be provided to the model. In an example, model querying module 114, e.g., in conjunction with processor(s) 102, memory/memories 104, operating system 106, effect creation tool 110, etc., can provide, to the model (e.g., model 128), the indication of the expected syntax of the output string. In this regard, for example, model querying module 114 can provide the indication as additional input to the model 128 as instructions for preparing the output string based on the natural language string input. For example, model querying module 114 can provide, as input to the model 128, a format of the expected syntax, values that can be used (e.g., values for the category parameter and the possible values) and are supported by the syntax parsing module 116, etc. In one example, model querying module 114 can provide, as input to the model 128, codebase for the effect creation tool 110, documentation or tutorials of the effect creation tool 110, etc. Based on this information, model 128 can obtain natural language string input and can provide output strings in the expected syntax.

In method 200, at action 210, the output string can be mapped to one or more commands of a format for creating the element in the effect creation tool. In an example, syntax parsing module 116, e.g., in conjunction with processor(s) 102, memory/memories 104, operating system 106, effect creation tool 110, etc., map or otherwise parse the output string to one or more commands of the format for creating the element in the effect creation tool. For example, syntax parsing module 116 can include instructions for mapping certain terms received in the expected syntax (e.g., category parameter and corresponding value pairs) into commands that the effect creation tool 110 can understand (e.g., commands supported by an API of the effect creation tool 110. In one example, the output string can include multiple commands (e.g., multiple parameter/value pairs), and syntax parsing module 116 can map each of the multiple commands to associated commands (e.g., API calls) in the effect creation tool 110.

In a specific non-limiting example, for a natural language string "Add a mesh to create a tennis ball", the model 128 may return an output string in the following format:

Objects: SphereMesh

Texture: Green fur tennis ball

Material: Unlit

Syntax parsing module 116 may parse the output string into commands (e.g., API calls) in the effect creation tool 110 to create a sphere mesh, generate a texture from a studio or obtain a texture from a library of textures that corresponds to a green fur tennis ball, create a new material, and attach the dependencies (e.g., texture). This may cause the effect creation tool 110 to create element based on receiving the commands, and effect creation tool 110 can create the element, include the element in a user interface for selection and applying to video content being created, etc.

In an example, some elements can have multiple creation steps and multiple associated parameters. For example, a facemask can have an associated texture, associated skin tone, etc., where the natural language string indicates such. In this example, the output string for a facemask object can include the facemask category parameter, a parameter indicating a texture, a parameter indicating a skin tone, etc. In this example, syntax parsing module 116 can parse the output string into the multiple associated commands, such as a command to create a facemask object, a command to retrieve the texture from a library or generate the texture in a studio, a command to modify the texture based on skin tone, a command to apply the texture in a facemask shape, etc.

In another example, a natural language string can indicate to create a script that can be used with elements (e.g., elements created by the element creating module 118 or otherwise) for the video content during gameplay. In this example, model querying module 114 can provide the natural language string to the model 128, and can receive, as output from the model 128, an output string including a list of various elements to be created in the effect creation tool 110 that represent interactions during gameplay and associated effects to be rendered on the video content. For example, the natural language string can indicate to perform an effect on video based on an interaction during gameplay, such as a touch or swipe on a touchscreen. In this example, element creating module 118 can create the script to cause the effect to be performed during gameplay based on the interaction.

In a specific example, this functionality can be combined with effect creation. For example, the natural language string can indicate to create an effect to liquify an image and to increase or decrease the liquify intensity when a user swipes or taps a touchscreen. In this example, providing the natural language string to the model 128 can result in an output string of elements to cause creating of the liquify effect and a script to cause the liquify intensity modification based on touchscreen interaction. In this example, element creating module 118 can create the effect for use in the effect creation tool 110 and can associate the gameplay script with the effect for use during gameplay. For example, the output string from the model 128 can be in a syntax supported for scripts in the effect creation tool 110.

In method 200, at action 212, the one or more commands can be provided to the effect creation tool to cause creation of the element. In an example, element creating module 118, e.g., in conjunction with processor(s) 102, memory/memories 104, operating system 106, effect creation tool 110, etc., can provide the one or more commands to the effect creation tool 110 to cause creation of the effect. In an example, element creating module 118 can call one or more API functions of the effect creation tool 110 based on the commands to create the element. For example, in the example above, element creating module 118 can call an API to create the sphere mesh object in a list of objects for the video content being created, call an API to retrieve a green fur tennis ball texture from the studio or library, call an API to create the material based on the texture, and apply the material to the sphere mesh for the newly created element. In addition, user interface module 112 can display a UI having the newly created element as a selectable element for applying to the video content. In an example, the effect creation tool 110 can facilitate creation of video content for storing and later viewing, or for applying effects to real-time video content. As such, for example, element creating module 118 can create the element for use in stored video content that is being created, or for use in applying to real-time video content (e.g., at the time of capturing and/or displaying the real-time video content).

In method 200, optionally at action 214, training data can be provided to the model. In an example, model training module 120, e.g., in conjunction with processor(s) 102, memory/memories 104, operating system 106, effect creation tool 110, etc., can provide training data to the model (e.g., model 128). For example, model training module 120 can provide feedback received from user interaction with a user interface regarding whether the created element(s) were relevant to the natural language string received via the user interface or not, a degree or rating of the created element(s) with respect to the natural language string, etc. In another example, model training module 120 can provide training data to the model that includes the expected syntax for output strings, as described above.

Figure 3:
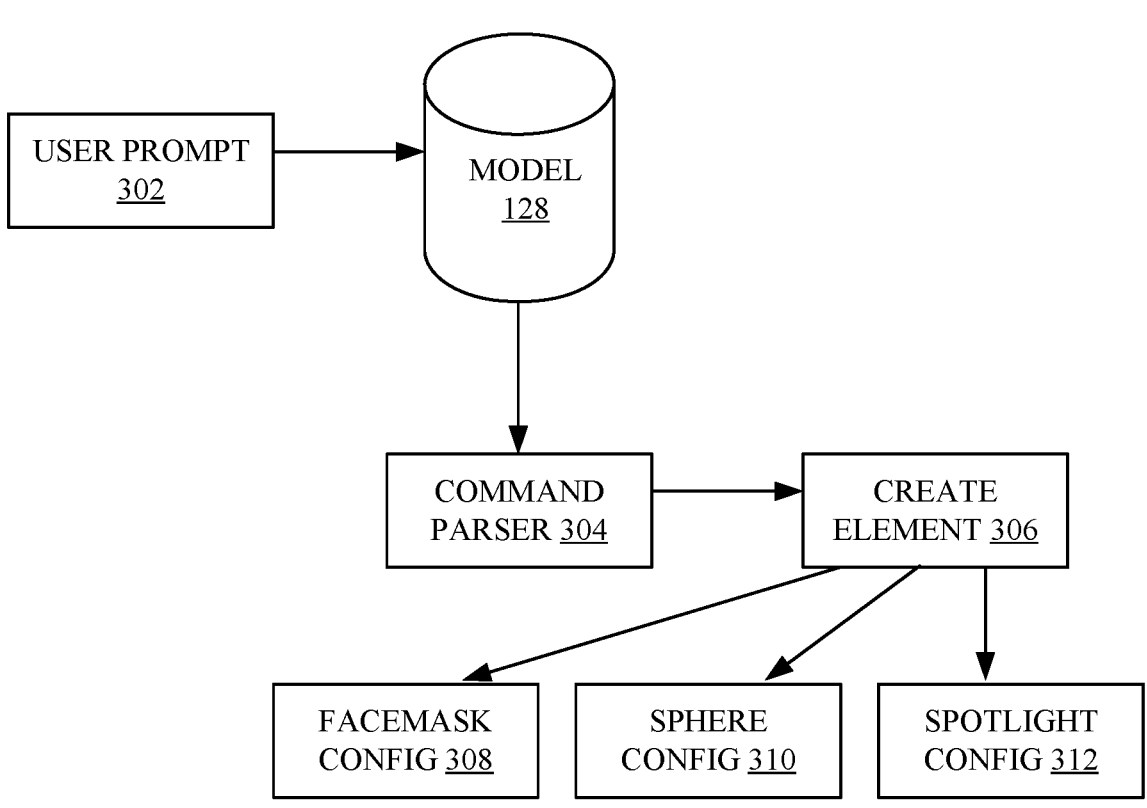
FIG. 3 is a block diagram that illustrates an example of interactions with a model, in accordance with examples described herein.

FIG. 3 is a block diagram that illustrates an example of interactions 300 with a model 128, in accordance with aspects described herein. For example, interactions 300 can include input interactions with the model 128 or output interactions with the model 128. For example, user interface module 112 can provide a UI with a user prompt 302 for creating an element for use in creating video content. In the user prompt 302, a user can input a natural language string for creating an image. Model querying module 114 can provide at least a portion of the natural language string to the model 128 for creating an element in the effect creation tool 110. In addition, in an example, model querying module 114 can provide an indication of an expected syntax for an output string to the model 128. Model querying module 114 can receive an output string from the model 128 for the natural string input, where the output string can be in an expected syntax, as described. Model querying module 114 can provide the output string to a command parser 304 (e.g., syntax parsing module 116) for parsing the output string into commands used to create the element 306.

In creating the element, the commands can be mapped to configurations for creating elements or modifying element properties, etc. The configurations may include a facemask config 308 for creating a facemask object, a sphere config

310 for creating a sphere object, a spotlight config 312 for creating a spotlight object, etc. The configurations can correspond to creating the different elements and can have additional associated properties that can be specified by the output string (e.g., depending on the output string formats provided to or used to train the model 128). For example, the facemask config 308 may also accept a texture parameter that provides the texture (e.g., image) of the facemask, a skin tone parameter that can be used to shade the facemask, etc. As such, for example, the output string may include the facemask category parameter and/or one or more property parameters, such as texture, tone, etc., where the natural language string includes or implies values for the associated parameters.

Figure 4:
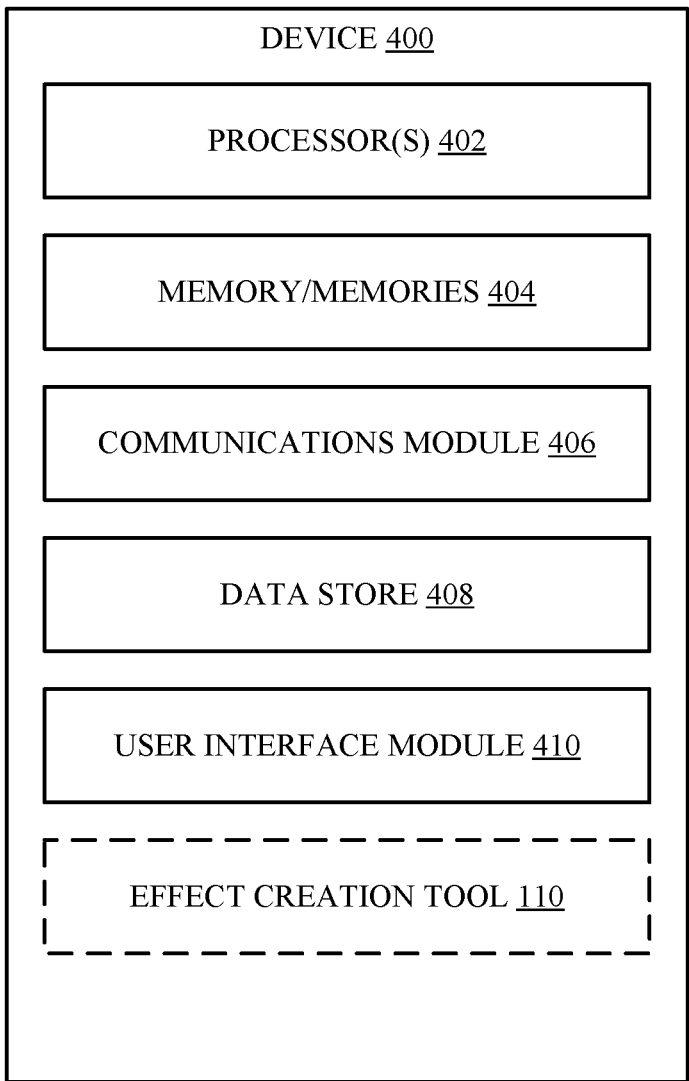
FIG. 4 is a schematic diagram of an example of a device for performing functions described herein.

FIG. 4 illustrates an example of device 400, similar to or the same as device 100 (FIG. 1), including additional optional component details as those shown in FIG. 1. In one implementation, device 400 may include processor(s) 402, which may be similar to processor(s) 102 for carrying out processing functions associated with one or more of components and functions described herein. Processor(s) 402 can include a single or multiple set of processors or multi-core processors. Moreover, processor(s) 402 can be implemented as an integrated processing system and/or a distributed processing system.

Device 400 may further include memory/memories 404, which may be similar to memory/memories 104 such as for storing local versions of applications being executed by processor(s) 402, such as effect creation tool 110, related modules, instructions, parameters, etc. Memory/memories 404 can include a type of memory usable by a computer, such as random access memory (RAM), read only memory (ROM), tapes, magnetic discs, optical discs, volatile memory, non-volatile memory, and any combination thereof.

Further, device 400 may include a communications module 406 that provides for establishing and maintaining communications with one or more other devices, parties, entities, etc., utilizing hardware, software, and services as described herein. Communications module 406 may carry communications between modules on device 400, as well as between device 400 and external devices, such as devices located across a communications network and/or devices serially or locally connected to device 400. For example, communications module 406 may include one or more buses, and may further include transmit chain modules and receive chain modules associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with implementations described herein. For example, data store 408 may be or may include a data repository for applications and/or related parameters (e.g., effect creation tool 110, related modules, instructions, parameters, etc.) being executed by, or not currently being executed by, processor(s) 402. In addition, data store 408 may be a data repository for effect creation tool 110, related modules, instructions, parameters, etc., and/or one or more other modules of the device 400.

Device 400 may include a user interface module 410 operable to receive inputs from a user of device 400 and further operable to generate outputs for presentation to the user. User interface module 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface module 410 may include one or more output devices, including but not limited to a display, a speaker, a haptic feedback mechanism, a printer, any other mechanism capable of presenting an output to a user, or any combination thereof. User interface module 410 may include or may communicate with user interface module 112 to allow input via user interface module 112, or receive output via user interface module 112 for displaying, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for creating elements in an effect creation tool, comprising:

receiving, via a user interface provided for the effect creation tool, a natural language string requesting creation of an element in the effect creation tool;

providing, to a model, an input including at least a portion of the natural language string;

receiving, from the model and based on the input, an output string, in an expected syntax, corresponding to creating the element;

mapping the output string to one or more commands of a format supported by the effect creation tool for creating, by the effect creation tool, the element as a selectable element that is selectable, via the effect creation tool, for applying to a stored or real-time video content; and providing the one or more commands to the effect creation tool to cause creation of the element in the effect creation tool.

2. The computer-implemented method of claim 1, further comprising providing, to the model, an indication of the expected syntax of the output string.

3. The computer-implemented method of claim 2, wherein the indication of the expected syntax includes multiple parameter names, and for each of the multiple parameter names, multiple possible parameter values, wherein the output string includes at least one of the multiple parameter names, and for each of the at least one of the multiple parameter names, at least one of the multiple parameter names, at least one of the multiple possible parameter values.

4. The computer-implemented method of claim 3, wherein the multiple parameter names correspond to elements that can be created in the effect creation tool.

5. The computer-implemented method of claim 1, wherein providing the one or more commands to the effect creation tool includes calling an application programming interface (API) function provided by the effect creation tool to cause creation of the element.

6. The computer-implemented method of claim 1, wherein the element includes one or more of a texture, material, visual effects, or gameplay element in the effect creation tool.

7. An apparatus for creating elements in an effect creation tool, the apparatus comprising one or more processors and one or more non-transitory memories with instructions thereon, wherein the instructions upon execution by the one or more processors, cause the one or more processors to:

receive, via a user interface provided for the effect creation tool, a natural language string requesting creation of an element in the effect creation tool;

provide, to a model, an input including at least a portion of the natural language string;

receive, from the model and based on the input, an output string, in an expected syntax, corresponding to creating the element;

map the output string to one or more commands of a format supported by the effect creation tool for creating, by the effect creation tool, the element as a selectable element that is selectable, via the effect creation tool, for applying to a stored or real-time video content; and provide the one or more commands to the effect creation tool to cause creation of the element in the effect creation tool.

8. The apparatus of claim 7, wherein the instructions upon execution by the one or more processors, cause the one or more processors to provide, to the model, an indication of the expected syntax of the output string.

9. The apparatus of claim 8, wherein the indication of the expected syntax includes multiple parameter names, and for each of the multiple parameter names, multiple possible parameter values, wherein the output string includes at least one of the multiple parameter names, and for each of the at least one of the multiple parameter names, at least one of the multiple possible parameter values.

10. The apparatus of claim 9, wherein the multiple parameter names correspond to elements that can be created in the effect creation tool.

11. The apparatus of claim 7, wherein the instructions upon execution by the one or more processors, cause the one or more processors to provide the one or more commands to the effect creation tool at least in part by calling an application programming interface (API) function provided by the effect creation tool to cause creation of the element.

12. The apparatus of claim 7, wherein the element includes one or more of a texture, material, visual effects, or gameplay element in the effect creation tool.

13. One or more non-transitory computer-readable storage media storing instructions that when executed by one or more processors cause the one or more processors to execute a method for creating elements in an effect creation tool, wherein the method comprises:

receiving, via a user interface provided for the effect creation tool, a natural language string requesting creation of an element in the effect creation tool;

providing, to a model, an input including at least a portion of the natural language string;

receiving, from the model and based on the input, an output string, in an expected syntax, corresponding to creating the element;

mapping the output string to one or more commands of a format supported by the effect creation tool for creating, by the effect creation tool, the element as a selectable element that is selectable, via the effect creation tool, for applying to a stored or real-time video content; and providing the one or more commands to the effect creation tool to cause creation of the element in the effect creation tool.

14. The one or more non-transitory computer-readable storage media of claim 13, the method further comprising providing, to the model, an indication of the expected syntax of the output string.

15. The one or more non-transitory computer-readable storage media of claim 14, wherein the indication of the expected syntax includes multiple parameter names, and for each of the multiple parameter names, multiple possible parameter values, wherein the output string includes at least one of the multiple parameter names, and for each of the at least one of the multiple parameter names, at least one of the multiple possible parameter values.

16. The one or more non-transitory computer-readable storage media of claim 15, wherein the multiple parameter names correspond to elements that can be created in the effect creation tool.

17. The one or more non-transitory computer-readable storage media of claim 13, wherein providing the one or more commands to the effect creation tool includes calling an application programming interface (API) function provided by the effect creation tool to cause creation of the element.

* * * * *